(12) United States Patent
Xu et al.

(10) Patent No.: US 12,120,693 B2
(45) Date of Patent: Oct. 15, 2024

(54) METHOD AND DEVICE FOR RECEIVING INFORMATION AND SENDING INFORMATION

(71) Applicant: GUANGDONG OPPO MOBILE TELECOMMUNICATIONS CORP., LTD., Guangdong (CN)

(72) Inventors: Weijie Xu, Guangdong (CN); Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 620 days.

(21) Appl. No.: 17/226,985

(22) Filed: Apr. 9, 2021

(65) Prior Publication Data
US 2021/0227524 A1    Jul. 22, 2021

Related U.S. Application Data

(63) Continuation of application No. PCT/CN2018/111056, filed on Oct. 19, 2018.

(51) Int. Cl.
*H04W 72/23*      (2023.01)
*H04W 72/0453*   (2023.01)

(52) U.S. Cl.
CPC ........ *H04W 72/23* (2023.01); *H04W 72/0453* (2013.01)

(58) Field of Classification Search
CPC ............. H04W 72/23; H04W 72/0453; H04W 72/231; H04W 72/232; H04L 5/0053; H04L 5/0098; H04L 5/001; Y02D 30/70
See application file for complete search history.

(56) References Cited

U.S. PATENT DOCUMENTS

2012/0300715 A1* 11/2012 Pelletier ............ H04W 56/0005
                                                              370/329
2013/0012186 A1*  1/2013 Kim ........................ H04L 5/001
                                                              455/418

(Continued)

FOREIGN PATENT DOCUMENTS

EP        2996418 A1    3/2016
EP        3478019 A1    5/2019

(Continued)

OTHER PUBLICATIONS

Huawei, et al., "Bandwidth Part Activation and Adaptation", 3GPP TSG RAN WG1 Meeting #90, R1-1712155, Aug. 12, 2017.

(Continued)

*Primary Examiner* — Ian N Moore
*Assistant Examiner* — Sun Jong Kim
(74) *Attorney, Agent, or Firm* — PERKINS COIE LLP (57) ABSTRACT

Provided are a method and device for receiving information and sending information. The method for receiving information is applied to a terminal device that transmits data by means of carrier aggregation, and the method includes: the terminal device receiving first instruction information sent by a network device, wherein the first instruction information is used to instruct the terminal device to execute at least two of the following: activating a target carrier, activating a target bandwidth part (BWP), activating a target physical downlink control channel (PDCCH) search space, switching the currently activated carrier to the target carrier, switching the currently activated BWP to the target BWP, and switching the currently activated PDCCH search space to the target PDCCH search space.

20 Claims, 2 Drawing Sheets

(56) References Cited

U.S. PATENT DOCUMENTS

| | | | | |
|---|---|---|---|---|
| 2013/0058233 | A1* | 3/2013 | Kim | H04L 5/001 |
| | | | | 370/252 |
| 2018/0183551 | A1 | 6/2018 | Chou et al. | |
| 2020/0029330 | A1* | 1/2020 | Nam | H04L 5/0094 |
| 2020/0275514 | A1* | 8/2020 | Takahashi | H04W 76/19 |
| 2020/0296656 | A1* | 9/2020 | Amuru | H04L 1/1816 |
| 2020/0367253 | A1* | 11/2020 | Kim | H04W 24/08 |
| 2021/0044408 | A1* | 2/2021 | Kubota | H04W 72/23 |
| 2021/0075581 | A1* | 3/2021 | Takeda | H04L 5/0094 |

FOREIGN PATENT DOCUMENTS

| | | |
|---|---|---|
| WO | 2010104361 A2 | 9/2010 |
| WO | 2014205742 A1 | 12/2014 |
| WO | 2018121621 A1 | 7/2018 |

OTHER PUBLICATIONS

International Search Report dated Jun. 27, 2019 cited in PCT/CN2018/111056.
Guangdong Oppo Mobile Telecom, "Bandwidth Part Based Resource Scheduling for Carrier Aggregation", 3GPP TSG RAN WG1 Meeting #90, R1-1713265, Aug. 11, 2017.
Extended European Search Report for Application No. 18937206.3 issued Oct. 4, 2021. 8 pages.
Office Action of the Indian application No. 202127020812, issued on Feb. 25, 2022. 6 pages with English Translation.
Extended European Search Report of the European application No. 23183889.7, issued on Aug. 8, 2023. 8 pages.

* cited by examiner

METHOD AND DEVICE FOR RECEIVING INFORMATION AND SENDING INFORMATION

CROSS-REFERENCE TO RELATED APPLICATION

The present application is a continuation application of International PCT Application No. PCT/CN2018/111056, filed on Oct. 19, 2018, the entire content of which is hereby incorporated by reference.

TECHNICAL FIELD

Implementations of the present disclosure relate to the field of communication, and more particularly, to a method for receiving information, a method for sending information and a device.

BACKGROUND

At present, research and standardization of 5G technology make wireless broadband mobile communication have a higher peak rate, a larger transmission bandwidth and a lower transmission delay. For example, a working bandwidth of a 5G terminal device is in a scale of 100 MHz to hundreds of MHz, the data transmission rate is in a scale of Gigabits per second (Gbps), and the transmission delay is reduced to in a scale of ms.

However, for terminal devices, it also brings some problems in implementation and specific use. For example, a broadband terminal device radio frequency and an extremely fast baseband processing lead to increase of power consumption of the terminal device compared with the previous wireless communication systems. This will affect standby time and usage time of 5G terminal devices, and even affect their battery life.

Therefore, how to reduce the power consumption of terminal devices is an urgent technical problem to be solved in the field.

SUMMARY

Provided are a method for receiving information, a method for sending information and a device, which can effectively reduce the power consumption of terminal devices.

In a first aspect, a method for receiving information is provided, which is applied to a terminal device for data transmission by means of carrier aggregation. The method includes:
receiving, by the terminal device, first indication information sent by a network device;
wherein the first indication information is used for indicating the terminal device to execute at least two of the following:
activating a target carrier, activating a target bandwidth part (BWP), activating a target physical downlink control channel (PDCCH) search space, switching a currently activated carrier to the target carrier, switching a currently activated BWP to the target BWP, and switching a currently activated PDCCH search space to the target PDCCH search space.

In some possible implementations, before receiving, by the terminal device, the first indication information sent by the network device, the method further includes:
receiving, by the terminal device, mapping relationship information sent by the network device, wherein the mapping relationship information includes a corresponding relationship between at least one piece of indication information and at least one combination, and the at least one piece of indication information includes the first indication information;
wherein each of the at least one combination includes at least two of the following:
activating the target carrier, activating the target BWP, activating the target PDCCH search space, switching a currently activated carrier to the target carrier, switching a currently activated BWP to the target BWP, and switching a currently activated PDCCH search space to the target PDCCH search space.

In some possible implementations, each of the at least one piece of indication information includes at least one bit.

In some possible implementations, a quantity of the at least one bit is related to a quantity of target carriers, a maximum quantity of activatable BWPs on a target carrier and a maximum quantity of activatable PDCCH search spaces on a target BWP.

In some possible implementations, receiving, by the terminal device, the first indication information sent by the network device includes:
monitoring, by the terminal device, target downlink control information (DCI) on a PDCCH in a target time unit, wherein the target DCI includes the first indication information.

In some possible implementations, monitoring, by the terminal device, the target downlink control information (DCI) on the PDCCH in the target time unit, includes:
monitoring, by the terminal device, the target DCI in a PDCCH search space on a component carrier that has already been in an activated state, and/or
monitoring, by the terminal device, the target DCI in a PDCCH search space on a component carrier in an activated state predetermined by the terminal device and the network device.

In some possible implementations, the PDCCH search space on the component carrier includes:
a common PDCCH search space and/or a specific PDCCH search space.

In some possible implementations, the target DCI is information scrambled with specific Radio Network Temporary Identity (RNTI).

In some possible implementations, the method further includes:
executing, by the terminal device, what is indicated in the first indication information at a kth time unit after the target time unit, wherein k is a non-negative integer.

In some possible implementations, before receiving, by the terminal device, the first indication information sent by the network device, the method further includes:
receiving, by the terminal device, a media access control (MAC) control element (CE) sent by the network device, wherein the MAC CE is used for indicating the terminal device to activate a first carrier, and the target carrier and the first carrier are different or the same.

In some possible implementations, before receiving, by the terminal device, the first indication information sent by the network device, the method further includes:
receiving, by the terminal device, configuration information sent by the network device, wherein the configuration information includes:
configuration information of at least one carrier, configuration information of BWPs on each carrier and configuration information of PDCCH search spaces on each BWP, wherein the at least one carrier includes the target carrier, and/or an index of each of the at least one carrier, indexes of BWPs on each carrier, and indexes of PDCCH search spaces on each BWP.

In some possible implementations, the target carrier includes the target BWP, and the target BWP includes the target PDCCH search space.

In a second aspect, a method for sending information is provided. The method includes:

generating, by a network device, first indication information for indicating a terminal device to execute at least two of the following: activating a target carrier, activating a target bandwidth part (BWP), activating a target physical downlink control channel (PDCCH) search space, switching a currently activated carrier to the target carrier, switching a currently activated BWP to the target BWP, and switching a currently activated PDCCH search space to the target PDCCH search space; and sending, by the network device, the first indication information to the terminal device.

In some possible implementations, before sending, by the network device, the first indication information to the terminal device, the method further includes:

sending, by the network device, mapping relationship information to the terminal device, wherein the mapping relationship information includes a corresponding relationship between at least one piece of indication information and at least one combination, the at least one piece of indication information includes the first indication information;

wherein each of the at least one combination includes at least two of the following:

activating the target carrier, activating the target BWP, activating the target PDCCH search space, switching a currently activated carrier to the target carrier, switching a currently activated BWP to the target BWP, and switching a currently activated PDCCH search space to the target PDCCH search space.

In some possible implementations, each of the at least one piece of indication information includes at least one bit.

In some possible implementations, a quantity of the at least one bit is related to a quantity of target carriers, a maximum quantity of activatable BWPs on a target carrier and a maximum quantity of activatable PDCCH search spaces on a target BWP.

In some possible implementations, sending, by the network device, the first indication information to the terminal device includes:

sending, by the network device, target downlink control information (DCI) to the terminal device on a PDCCH in a target time unit, wherein the target DCI includes the first indication information.

In some possible implementations, sending, by the network device, the target downlink control information (DCI) to the terminal device on the PDCCH in the target time unit includes:

sending, by the network device, the target DCI to the terminal device in a PDCCH search space on a component carrier that has already been in an activated state, and/or sending, by the network device, the target DCI to the terminal device in a PDCCH search space on a component carrier in an activated state predetermined by the terminal device and the network device.

In some possible implementations, the PDCCH search space on the component carrier includes:

a common PDCCH search space and/or a specific PDCCH search space.

In some possible implementations, the target DCI is information scrambled with specific RNTI.

In some possible implementations, before sending, by the network device, the first indication information to the terminal device, the method further includes:

sending, by the network device, a media access control (MAC) control element (CE) to the terminal device, wherein the MAC CE is used for indicating the terminal device to activate a first carrier, and the target carrier and the first carrier are different or the same.

In some possible implementations, before sending, by the network device, the first indication information to the terminal device, the method further includes:

sending, by the network device, configuration information to the terminal device, wherein the configuration information includes:

configuration information of at least one carrier, configuration information of BWPs on each carrier and configuration information of PDCCH search spaces on each BWP, wherein the at least one carrier includes the target carrier, and/or an index of each of the at least one carrier, indexes of BWPs on each carrier, and indexes of PDCCH search spaces on each BWP.

In some possible implementations, the target carrier includes the target BWP, and the target BWP includes the target PDCCH search space.

In a third aspect, a terminal device is provided for executing the method in the first aspect or various implementations thereof. Specifically, the terminal device includes function modules configured to execute the method in the first aspect or various implementations thereof.

In a fourth aspect, a network device is provided for executing the method in the second aspect or various implementations thereof. Specifically, the network device includes function modules configured to execute the method in the second aspect or various implementations thereof.

In a fifth aspect, a terminal device is provided, which includes a processor and a memory. The memory is configured to store a computer program. The processor is configured to call and run the computer program stored in the memory to execute the method in the first aspect or various implementations thereof.

In a sixth aspect, a network device is provided, which includes a processor and a memory. The memory is configured to store a computer program. The processor is configured to call and run the computer program stored in the memory to execute the method in the second aspect or various implementations thereof.

In a seventh aspect, a chip is provided, which is configured to implement the method in any one of the first to second aspects or various implementations thereof. Specifically, the chip includes a processor used to call and run a computer program from a memory, so that a device on which the chip is installed executes the method in any one of the first to second aspects or various implementations thereof.

In an eighth aspect, a computer readable storage medium is provided, which is configured to store a computer program that enables a computer to execute the method in any one of the first to second aspects or various implementations thereof.

In a ninth aspect, a computer program product is provided, which includes computer program instructions that enable a computer to execute the method in any one of the first to second aspects or various implementations thereof.

In a tenth aspect, a computer program is provided, which, when running on a computer, enables a computer to execute the method in any one of the first to second aspects or various implementations thereof.

Based on the above technical solution, the network device may, through the first indication information, simultaneously indicate the terminal device to perform at least two of following: activating a target carrier, activating a target bandwidth part (BWP), activating a target physical downlink control channel (PDCCH) search space, switching a currently activated carrier to the target carrier, switching a currently activated BWP to the target BWP, and switching a currently activated PDCCH search space to the target PDCCH search space, so as to quickly adapt to services of the terminal device, for example, it can respond to service change in time, realize immediate transmission of the services and when the service amount on the terminal device becomes small, realize energy saving of the terminal device.

In other words, according to the technical solutions of the implementations of the present disclosure, through the first indication information, the activation and deactivation of carriers can be quickly realized, switching of the BWP can be quickly realized for the activated carrier, and switching of the PDCCH search space configuration can be quickly realized for the activated search space, so that the network device can quickly adjust the configuration of the terminal device according to the load situation of the terminal device so as to match the service situation of the terminal device, thereby reducing the power consumption of the terminal device when there is no data transmission.

DETAILED DESCRIPTION

The technical solutions in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

Figure 1:
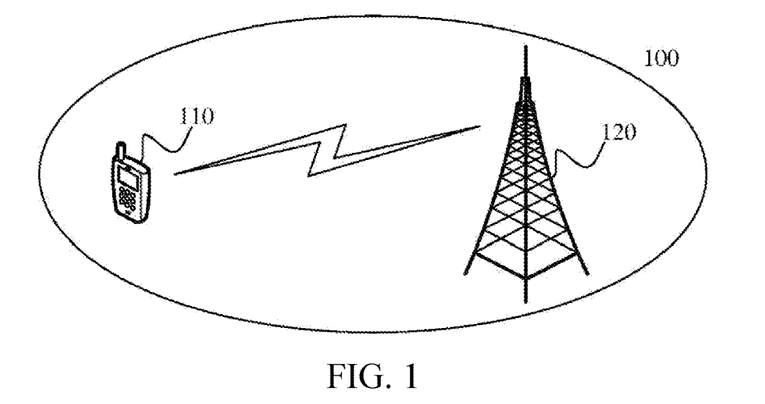
FIG. 1 is an example of an application scenario of the present disclosure.

FIG. 1 is a schematic diagram of an application scenario according to an implementation of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the communication system 100 is only an example for describing an implementation of the present disclosure. However, implementations of the present disclosure are not limited to this. That is, the technical solutions of the implementations of the present disclosure may be applied to various communication systems, such as, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Time Division Duplex (TDD) system, a Universal Mobile Telecommunication System (UMTS), a Worldwide Interoperability for Microwave Access (WiMAX) communication system, a New Radio (NR) System or a future 5G system, etc.

Taking a 5G system as an example, the technical solutions of the implementations of the present disclosure may be applied to a mode of Long Term Evolution (LTE) coverage in a wide area and NR island coverage. Moreover, as a large amount of LTE is deployed below 6 GHz, few spectrums below 6 GHz may be used for 5G. Therefore, the NR has to research a spectrum application above 6 GHz, however in a high frequent band, the coverage is limited and the signal fading is fast. Meanwhile, a working mode of tight interworking between the LTE and the NR is proposed so as to protect previous investments of mobile operators in LTE.

Main application scenarios of the 5G include: Enhance Mobile Broadband (eMBB), Ultra-Reliable and Low Latency Communication (URLLC), Mass Machine Type of Communication (mMTC). Among them, the eMBB aims at making users obtain multimedia contents, services and data, and the demands for the eMBB are growing rapidly. As the eMBBs may be deployed in different scenarios, for example, indoor, urban area, countryside, etc., and their capabilities and demands are quite different, and cannot be generalized, and may be analyzed in detail with specific deployment scenarios. Typical applications of the URLLC include: industrial automation, power automation, telemedicine operation (surgery), traffic safety, etc. Typical characteristics of the mMTC include: high connection density, small data volume, delay-insensitive service, low cost and long service life of modules, etc.

In addition, since the complete 5G NR coverage is difficult to achieve, the network coverage in the implementations of the present disclosure may adopt the mode of Long Term Evolution (LTE) coverage in a wide area and NR island coverage. Meanwhile, to protect the previous investments of mobile operators in LTE, the working mode of tight interworking between the LTE and the NR may be further adopted.

In particular, the technical solutions of the implementations of the present disclosure may be applied to various communication systems based on non-orthogonal multiple access technologies, such as a Sparse Code Multiple Access (SCMA) system, and a Low Density Signature (LDS) system, etc. Of course, the SCMA system and the LDS system may also be referred to as other names in the communication field. Further, the technical solutions of the implementations of the present disclosure may be applied to a multicarrier transmission system adopting the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system, and a Filtered OFDM (F-OFDM) system, which adopt the non-orthogonal multiple access technology, or the like.

In the communication system 100 shown in FIG. 1, the network device 120 may be an access network device communicating with the terminal device 110. The access network device may provide communication coverage for a specific geographic area and may communicate with the terminal device 110 (e.g., UE) located within the coverage area.

Optionally, the network device 120 may be a Base Transceiver Station (BTS) in a Global System of Mobile Communication (GSM) system or Code Division Multiple Access (CDMA); or may be a NodeB (NB) in Wideband Code Division Multiple Access (WCDMA) system. The network device 120 may be an Evolutional Node B (eNB or eNodeB) in a Long Term Evolution (LTE) system. Optionally, the network device 120 may be a base station (gNB) in a Next Generation Radio Access Network (NG RAN) or an NR system, or a radio controller in a Cloud Radio Access Network (CRAN), or the access network device may be a relay station, an access point, an on-board device, a wearable device, a hub, a switch, a bridge, a router, or a network device in a future evolved Public Land Mobile Network (PLMN), etc.

Optionally, the terminal device 110 may be any terminal device, which includes, but not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another terminal device, configured to receive/send a communication signal; and/or an Internet of Things (IOT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, terminal direct connection (Device to Device, D2D) communication may be performed between the terminal devices 110.

FIG. 1 exemplarily shows a network device and a terminal device. Optionally, the communication system 100 may include multiple network devices, and other quantities of terminal devices may be included within a coverage area of each network device. Implementations of the present disclosure are not limited thereto.

Optionally, the communication system 100 may include network controllers, mobile management entities, and other network entities. Implementations of the present disclosure are not limited thereto.

It should be understood that, all the devices with a communication function in a network/system in the implementations of the present disclosure may be referred to as a communication device. The communication system 100 shown in FIG. 1 is taken as an example, the communication device may include a network device 120 and a terminal device 110 which have communication functions, and the network device 120 and the terminal device 110 may be the devices described above, which will not be described here again. The terminal device may also include other devices in the communication system 100, such as a network controller, a mobile management entity, and other network entities, and the implementations of the present disclosure are not limited thereto.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
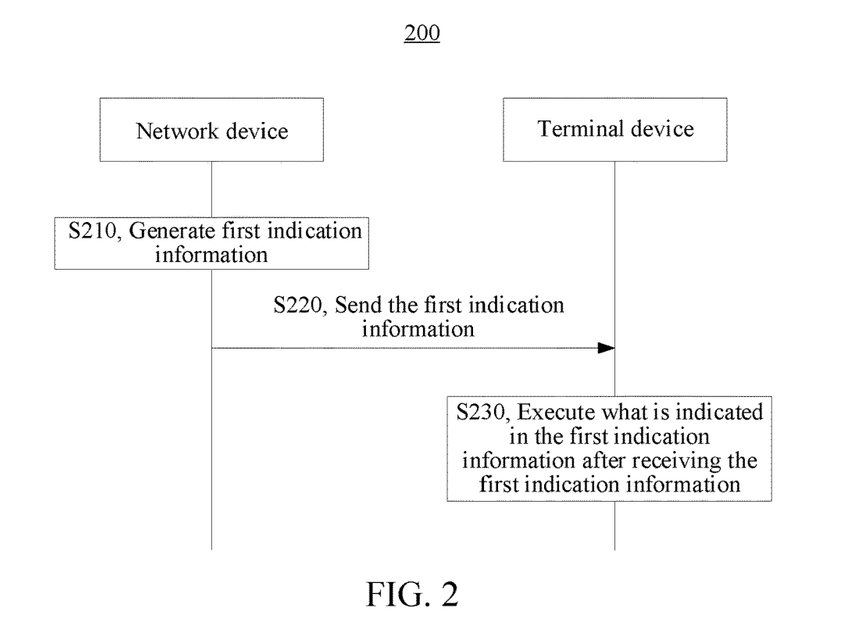
FIG. 2 is a schematic flow chart of a communication method according to an implementation of the present disclosure.

FIG. 2 is a schematic flow chart of a communication method 200 according to an implementation of the present disclosure. The terminal device shown in FIG. 2 may be configured to execute a method for receiving information, and the terminal device shown in FIG. 2 may be the terminal device shown in FIG. 1. The network device shown in FIG. 2 may be configured to execute a method for sending information, and the network device shown in FIG. 2 may be the access network device shown in FIG. 1.

As shown in FIG. 2, the communication method 200 may include the following acts S210-S230.

In S210, a network device generates first indication information.

In S220, the network device sends the first indication information to a terminal device.

In S230, after receiving the first indication information, the terminal device executes what is indicated in the first indication information. Optionally, the terminal device may specifically execute what is indicated in the first indication information at a kth time unit after a target time unit, wherein k is a non-negative integer.

The first indication information is used for indicating the terminal device to execute at least two of the following:
  activating a target carrier, activating a target bandwidth part (BWP), activating a target physical downlink control channel (PDCCH) search space, switching a currently activated carrier to the target carrier, switching a currently activated BWP to the target BWP, and switching a currently activated PDCCH search space to the target PDCCH search space.

Optionally, the target carrier includes the target BWP, and the target BWP includes the target PDCCH search space.

As an implementation, the first indication information may be used for indicating whether the target carrier is in a deactivated state or an activated state. Optionally, the first indication information may also be used for indicating to activate or deactivate the target BWP on the target carrier if the first indication information is used for indicating that the target carrier is in an activated state, or, if the terminal device has already have a BWP configuration in use on the target carrier, the first indication information may indicate to switch to the target BWP. Optionally, the first indication information may also be used for indicating to activate or deactivate the target PDCCH search space on the target BWP on the target carrier; or, if there has already been a corresponding PDCCH search space configuration in use on the target BWP, the first indication information may also be used for indicating to switch to the target PDCCH search space.

As another implementation, an existing MAC CE activation mode are adopted for a carrier activation mode, and for the activated carrier, the first indication information may be used for indicating to activate or deactivate the target BWP or the switched target BWP. Optionally, the first indication information may also be used for indicating to activate or deactivate the target BWP on the target carrier; or, if the terminal device has already have a BWP configuration in use on the target carrier, the first indication information may be used for indicating the switched target BWP. Optionally, the first indication information may also be used for indicating to activate or deactivate the target PDCCH search space on the target BWP on the target carrier; or, if there has already been a corresponding PDCCH search space configuration in use on the target BWP, the first indication information may also be used for indicating to switch to the target PDCCH search space.

In the implementations of the present disclosure, the network device may, through the first indication information, simultaneously indicate the terminal device to perform at least two of the following: activating a target carrier, activating a target bandwidth part (BWP), activating a target physical downlink control channel (PDCCH) search space, switching a currently activated carrier to the target carrier, switching a currently activated BWP to the target BWP, and switching a currently activated PDCCH search space to the target PDCCH search space, so as to quickly adapt to services of the terminal device, for example, it can respond to service change in time, realize immediate transmission of the services, and when the service amount on the terminal device becomes small, realize energy saving of the terminal device. In other words, according to the technical solutions of the implementations of the present disclosure, through the first indication information, the activation and deactivation of carriers can be quickly realized, switching of the BWP can be quickly realized for the activated carrier, and switching of the PDCCH search space configuration can be quickly realized for the activated search space, so that the network device can quickly adjust the configuration of the terminal device according to the load situation of the terminal device so as to match the service situation of the terminal device, thereby reducing the power consumption of the terminal device when there is no data transmission.

It should be understood that the method 200 may be applied to a terminal device for data transmission by means of carrier aggregation. The carrier aggregation may enable the terminal device to use multiple carriers to transmit and receive data simultaneously, thereby improving the data transmission rate and the system working efficiency.

Optionally, before receiving, by the terminal device, the first indication information sent by the network device, the method further includes:

the terminal device receives mapping relationship information sent by the network device, wherein the mapping relationship information includes a corresponding relationship between at least one piece of indication information and at least one combination, and the at least one piece of indication information includes the first indication information;

wherein each of the at least one combination includes at least two of the following:

activating the target carrier, activating the target BWP, activating the target PDCCH search space, switching a currently activated carrier to the target carrier, switching a currently activated BWP to the target BWP, and switching a currently activated PDCCH search space to the target PDCCH search space.

Optionally, each of the at least one piece of indication information includes at least one bit.

Optionally, a quantity of the at least one bit is related to a quantity of target carriers, a maximum quantity of activatable BWPs on a target carrier and a maximum quantity of activatable PDCCH search spaces on a target BWP.

In the following, a combination of deactivating a target carrier, activating a BWP on the target carrier, and activating a PDCCH search space on the BWP will be taken as an example to explain at least one combination of the implementations of the present disclosure. It should be understood that the target carrier may be any one of the candidate carriers of the terminal device. For example, it is assumed that the terminal device has N candidate aggregated carriers. For example, if N=5, these five carriers may be numbered as 0, 1, 2, 3, and 4 respectively. The target carrier may be any one of the carriers numbered 0, 1, 2, 3 and 4.

It is assumed that M BWP configuration information, that is, which correspond to M BWPs, at most are indicated on the target carrier. It is assumed that each BWP is configured with N PDCCH search space configuration information, that is, which correspond to N PDCCH search spaces, at most. It can be found that there are M*N+1 combinations of deactivating a target carrier, activating a BWP on the target carrier, and activating a PDCCH search space on the BWP. That is, one candidate carrier of the terminal device may correspond to M*N+1 indication information.

Assuming that M=4 and N=3, the indication information corresponding to the target carrier needs to indicate 13 states.

In an implementation of the present disclosure, if all of the 13 states are indicated by bits, four bits are needed for indication for one carrier. Optionally, the indication information needs to use a total of 5*4=20 bits for 5 carriers. It should be understood that in other alternative implementations, a quantity of bits may also be referred to as a bit quantity of bits, which is not specifically limited by the implementations of the present disclosure.

The following describes in detail a corresponding relationship between at least one piece of indication information and at least one combination with reference to Table 1.

TABLE 1

Table of corresponding relationship between at least one piece of indication information and at least one combination

| At least one piece of indication information | Carrier state | Target BWP | Target PDCCH search space |
|---|---|---|---|
| 0000 | deactivate | — | — |
| 0001 | activate | BWP 0 | PDCCH search space 0 |

TABLE 1-continued

Table of corresponding relationship between at least one piece of indication information and at least one combination

| At least one piece of indication information | Carrier state | Target BWP | Target PDCCH search space |
|---|---|---|---|
| 0010 | activate | BWP 0 | PDCCH search space 1 |
| 0011 | activate | BWP 0 | PDCCH search space 2 |
| 0100 | activate | BWP 1 | PDCCH search space 0 |
| 0101 | activate | BWP 1 | PDCCH search space 1 |
| 0110 | activate | BWP 1 | PDCCH search space 2 |
| 0111 | activate | BWP 2 | PDCCH search space 0 |
| 1000 | activate | BWP 2 | PDCCH search space 1 |
| 1001 | activate | BWP 2 | PDCCH search space 2 |
| 1010 | activate | BWP 3 | PDCCH search space 0 |
| 1011 | activate | BWP 3 | PDCCH search space 1 |
| 1100 | activate | BWP 3 | PDCCH search space 2 |
| 1101 | | | reserved bit value |
| 1110 | | | reserved bit value |
| 1111 | | | reserved bit value |

As shown in Table 1, it is assumed that four BWPs are configured on the target carrier, and the four BWPs are BWPs numbered 0, 1, 2 and 3 respectively. It is assumed that each BWP is configured with N PDCCH search space configuration information, that is, which corresponds to N PDCCH search spaces, at most, for example, three PDCCH search spaces shown in Table 1, which are PDCCH search spaces numbered 0, 1 and 2 respectively. Then, 4 bits may be used for indicating the 13 states of the target carrier.

For example, 0000 may be used for indicating to deactivate the target carrier.

For another example, 0001 may be used for indicating to activate the target carrier, activate BWP 0 on the target carrier, and activate PDCCH search space 0 on BWP 0.

It should be understood that Table 1 is only an example of the at least one piece of indication information and the at least one combination, and it should not be understood as limiting the implementations of the present disclosure. For example, a relationship between the order of bits of the at least one piece of indication information and the at least one combination shown in Table 1 may be adjusted. For example, in other alternative implementations, 0000 may be used for indicating to activate the target carrier, and activate BWP 0 on the target carrier and PDCCH search space 0 on BWP 0.

Optionally, the relationship between the order of the bits of the at least one piece of indication information and the at least one combination may be predetermined in advance or notified by the network device to the terminal device.

A manner in which the terminal device receives the first indication information sent by the network device will be described below.

Optionally, the terminal device monitors target downlink control information (DCI) on a PDCCH in a target time unit, and the target DCI includes the first indication information.

For example, the terminal device monitors the target DCI in a PDCCH search space on a component carrier that has already been in an activated state.

For another example, the terminal device monitors the target DCI in a PDCCH search space on a component carrier in an activated state predetermined by the terminal device and the network device.

Optionally, the PDCCH search space on the component carrier includes:
a common PDCCH search space and/or a specific PDCCH search space.

Optionally, the target DCI is information scrambled with a specific RNTI.

It should be understood that the implementations of the present disclosure do not specifically limit an indication mode of the first indication information. For example, the indication mode of the first indication information may also adopt a mode of activating a carrier, deactivating a carrier or switching a carrier in the prior art. For another example, the indication mode of the first indication information may adopt a mode of activating a BWP, deactivating a BWP or switching a BWP in the existing art. For another example, the indication mode of the first indication information may adopt a mode of activating a PDCCH search space, deactivating a PDCCH search space or switching a PDCCH search space in the existing art.

The mode of activating the BWP, deactivating the BWP or switching the BWP includes but is not limited to a MAC CE mode or a Timer control mode. For example, in an LTE technology, when the terminal device receives an activation command of a secondary cell (SCell) at subframe n, a corresponding activation operation will be initiated at subframe n+8. When at subframe n the terminal device receives a deactivation command or the deactivation timer of a SCell times out, except that an operation corresponding to the Channel State Information (CSI) (stop reporting) is completed at subframe n+8, other operations are completed within subframe n+8.

The mode of activating the BWP, deactivating the BWP or switching the BWP includes but is not limited to a DCI mode and a Timer control mode. For example, if the terminal device is not scheduled on a current BWP within a duration exceeding a timer, the terminal device will be triggered to switch to a default BWP of the carrier.

The mode of activating the PDCCH search space, deactivating the PDCCH search space or switching the PDCCH search space may adopt a Radio Resource Control (RRC) reconfiguration mode.

In the implementations of the present disclosure, when the component carrier has a larger bandwidth, for example, 5G FR1 (of which the frequency band is less than 6 GHZ) may support a component carrier bandwidth of maximum 80 MHz, and FR2 (of which the frequency band is greater than 6 GHZ) may support a component carrier bandwidth of maximum 400 MHz. If the terminal device performs data transmission by means of carrier aggregation, a data packet may be transmitted instantaneously in a short length of time.

On the other hand, the services of the terminal device also has a transient characteristic of coming and going.

Therefore, in the implementations of the present disclosure, if the terminal device can, by using the CA, quickly activate a target carrier, activate a target bandwidth part (BWP), activate a target physical downlink control channel (PDCCH) search space, switch a currently activated carrier to the target carrier, switch a currently activated BWP to the target BWP, and switch a currently activated PDCCH search space to the target PDCCH search space, the power consumption of the terminal device will be effectively saved.

Optionally, before the terminal device receives the first indication information sent by the network device, the terminal device may also receive a Media Access Control (MAC) control cell (CE) sent by the network device, wherein the MAC CE is used for indicating the terminal device to activate a first carrier, and the target carrier and the first carrier are different or the same.

Optionally, before receiving, by the terminal device, the first indication information sent by the network device, the method further includes:

receiving, by the terminal device, configuration information sent by the network device, wherein the configuration information includes:
configuration information of at least one carrier, configuration information of BWPs on each carrier and configuration information of PDCCH search spaces on each BWP, wherein the at least one carrier includes the target carrier, and/or an index of each of the at least one carrier, indexes of BWPs on each carrier, and indexes of PDCCH search spaces on each BWP.

In other words, before the network device sends the first indication information to the terminal device, the network device needs to send the following information to the terminal device in advance (which may use a form of RRC signaling):
configuration information of carriers and carrier numbers; different BWP configurations and BWP numbers; and different PDCCH search space configurations and corresponding numbers. Optionally, each PDCCH search space configuration may include a configuration of multiple PDCCH search spaces, that is, once a PDCCH search space configuration with a certain number is used, all PDCCH search spaces corresponding to the PDCCH search space configuration corresponding to the number will take effect.

In other words, the first indication information may be specifically used for indicating at least two of the following information:
an index of a carrier to be deactivated, an index of a carrier to be activated, an index of a BWP to be activated, an index of a PDCCH search space to be activated, an index of a target carrier to be switched from a currently activated carrier, an index of a BWP to be switched from a currently activated BWP, and an index of a PDCCH search space to be switched from a currently activated PDCCH search space.

The preferred implementations of the present disclosure have been described in detail above with reference to the attached drawings, but the present disclosure is not limited to the specific details of the above implementations. Within the technical conception of the present disclosure, various simple modifications can be made to the technical solutions of the present disclosure, all of which fall within the protection scope of the present disclosure.

For example, various specific technical features described in the above specific implementations can be combined in any suitable way without conflicts. In order to avoid unnecessary repetition, the present disclosure will not explain any possible combination ways separately.

For another example, different implementations of the present disclosure may be combined arbitrarily as long as they do not go against the conception of the present disclosure, and they should also be regarded as the contents disclosed in the present disclosure.

It should be understood that sequence numbers of the foregoing processes do not mean execution sequences in various method implementations of the present disclosure. The execution sequences of the processes should be determined according to functions and internal logic of the processes, and should not be construed as any limitation on the implementation processes of the implementations of the present disclosure.

Method implementations of the present disclosure are described in detail above in combination with FIG. 2. Device implementations of the present disclosure will be described in detail below in combination with FIG. 3 to FIG. 6.

Figure 3:
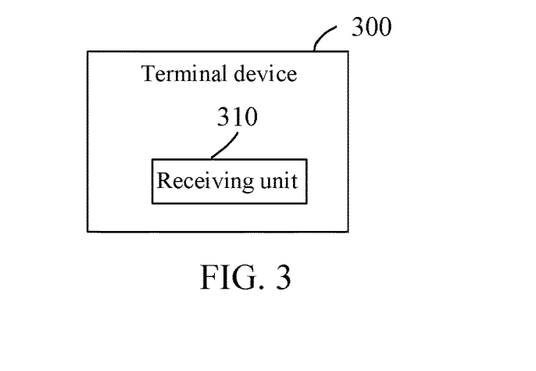
FIG. 3 is a schematic block diagram of a terminal device according to an implementation of the present disclosure.

FIG. 3 is a schematic block diagram of a terminal device 300 according to an implementation of the present disclosure, which may be applied to a terminal device for data transmission by means of carrier aggregation, for example, the terminal device shown in FIG. 1.

As shown in FIG. 3, the terminal device 300 may include a receiving unit 310 configured to receive first indication information sent by a network device; wherein the first indication information is used for indicating the terminal device to execute at least two of the following: activating a target carrier, activating a target bandwidth part (BWP), activating a target physical downlink control channel (PDCCH) search space, switching a currently activated carrier to the target carrier, switching a currently activated BWP to the target BWP, and switching a currently activated PDCCH search space to the target PDCCH search space.

Optionally, before the receiving unit 310 is configured to receive the first indication information sent by the network device, the receiving unit 310 is further configured to receive mapping relationship information sent by the network device, wherein the mapping relationship information includes a corresponding relationship between at least one piece of indication information and at least one combination, and the at least one piece of indication information includes the first indication information;
wherein each of the at least one combination includes at least two of the following:
activating the target carrier, activating the target BWP, activating the target PDCCH search space, switching a currently activated carrier to the target carrier, switching a currently activated BWP to the target BWP, and switching a currently activated PDCCH search space to the target PDCCH search space.

Optionally, each of the at least one piece of indication information includes at least one bit.

Optionally, a quantity of the at least one bit is related to a quantity of target carriers, a maximum quantity of activatable BWPs on a target carrier and a maximum quantity of activatable PDCCH search spaces on a target BWP.

Optionally, the receiving unit 310 is specifically configured to monitor target downlink control information (DCI) on a PDCCH in a target time unit, wherein the target DCI includes the first indication information.

Optionally, the receiving unit 310 is more specifically configured to monitor the target DCI in a PDCCH search space on a component carrier that has already been in an activated state, and/or
monitor the target DCI in a PDCCH search space on a component carrier in an activated state predetermined by the terminal device and the network device.

Optionally, the PDCCH search space on the component carrier includes: a common PDCCH search space and/or a specific PDCCH search space.

Optionally, the target DCI is information scrambled with a specific RNTI.

Optionally, the terminal device further includes an execution unit configured to execute what is indicated in the first indication information at a kth time unit after the target time unit, wherein k is a non-negative integer.

Optionally, before the receiving unit 310 is configured to receive the first indication information sent by the network device, the receiving unit 310 is further configured to receive a media access control (MAC) control element (CE) sent by the network device, wherein the MAC CE is used for indicating the terminal device to activate a first carrier, and the target carrier and the first carrier are different or the same.

Optionally, before the receiving unit 310 is configured to receive the first indication information sent by the network device, the receiving unit 310 is further configured to receive configuration information sent by the network device, wherein the configuration information includes:

configuration information of at least one carrier, configuration information of BWPs on each carrier and configuration information of PDCCH search spaces on each BWP, wherein the at least one carrier includes the target carrier, and/or an index of each of the at least one carrier, indexes of BWPs on each carrier, and indexes of PDCCH search spaces on each BWP.

Optionally, the target carrier includes the target BWP, and the target BWP includes the target PDCCH search space.

It should be understood that the device implementations and the method implementations may correspond to each other, and description of the method implementations may be referred to for similar description of the device implementations. Specifically, the terminal device 300 shown in FIG. 3 may correspond to the corresponding subject that executes the method 200 according to an implementation of the present disclosure, which is not described here for brevity.

Figure 4:
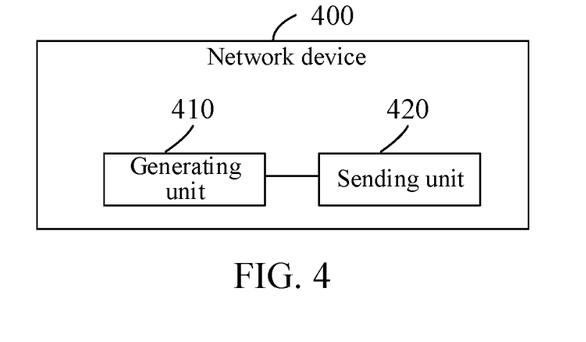
FIG. 4 is a schematic block diagram of a network device according to an implementation of the present disclosure.

FIG. 4 is a schematic block diagram of a network device 400 according to an implementation of the present disclosure.

As shown in FIG. 4, the network device 400 may include a generating unit 410 and a sending unit 420.

The generating unit 410 is configured to generate first indication information for indicating a terminal device to execute at least two of the following: activating a target carrier, activating a target bandwidth part (BWP), activating a target physical downlink control channel (PDCCH) search space, switching a currently activated carrier to the target carrier, switching a currently activated BWP to the target BWP, and switching a currently activated PDCCH search space to the target PDCCH search space.

The sending unit 420 is configured to send the first indication information to the terminal device.

Optionally, before the sending unit 420 is configured to send the first indication information to the terminal device, the sending unit 420 is further configured to send mapping relationship information to the terminal device, wherein the mapping relationship information includes a corresponding relationship between at least one piece of indication information and at least one combination, the at least one piece of indication information includes the first indication information;

wherein each of the at least one combination includes at least two of the following:

activating the target carrier, activating the target BWP, activating the target PDCCH search space, switching a currently activated carrier to the target carrier, switching a currently activated BWP to the target BWP, and switching a currently activated PDCCH search space to the target PDCCH search space.

Optionally, each of the at least one piece of indication information includes at least one bit.

Optionally, a quantity of the at least one bit is related to a quantity of the target carriers, a maximum quantity of activatable BWPs on a target carrier and a maximum quantity of activatable PDCCH search spaces on a target BWP.

Optionally, the sending unit 420 is specifically configured to send target downlink control information (DCI) to the terminal device on a PDCCH in a target time unit, wherein the target DCI includes the first indication information.

Optionally, the sending unit 420 is more specifically configured to send the target DCI to the terminal device in a PDCCH search space on a component carrier that has already been in an activated state, and/or send the target DCI to the terminal device in a PDCCH search space on a component carrier in an activated state predetermined by the terminal device and the network device.

Optionally, the PDCCH search space on the component carrier includes:

a common PDCCH search space and/or a specific PDCCH search space.

Optionally, the target DCI is information scrambled with a specific RNTI.

Optionally, before the sending unit 420 is configured to send the first indication information to the terminal device, the sending unit 420 is further configured to send a media access control (MAC) control element (CE) to the terminal device, wherein the MAC CE is used for indicating the terminal device to activate a first carrier, and the target carrier and the first carrier are different or the same.

Optionally, before the sending unit 420 is configured to send the first indication information to the terminal device, the sending unit 420 is further configured to send configuration information to the terminal device, wherein the configuration information includes:

configuration information of at least one carrier, configuration information of BWPs on each carrier and configuration information of PDCCH search spaces on each BWP, wherein the at least one carrier includes the target carrier, and/or an index of each of the at least one carrier, indexes of BWPs on each carrier, and indexes of PDCCH search spaces on each BWP.

Optionally, the target carrier includes the target BWP, and the target BWP includes the target PDCCH search space.

It should be understood that the device implementations and the method implementations may correspond to each other, and description of the method implementations may be referred to for similar description of the device implementations. Specifically, the network device 400 shown in FIG. 4 may correspond to the corresponding subject that executes the method 200 according to an implementation of the present disclosure, which is not described here for brevity.

In the above, the communication device of the implementations of the present disclosure is described from the perspective of functional modules with reference to FIG. 3 and FIG. 4. It should be understood that these functional modules may be realized by a form of hardware, or by instructions in a form of software, or by a combination of hardware and software modules.

Specially, acts of the method implementations in implementations of the present disclosure may be completed by integrated logic circuits of hardware in the processor and/or instructions in a form of software. The acts of the method disclosed in connection with the implementation of the present disclosure may be directly embodied by the execution of the hardware decoding processor, or by the execution of a combination of hardware in the decoding processor and software modules.

Optionally, the software modules may be located in a storage medium commonly used in the art, such as a random access memory, a flash memory, a read-only memory, a programmable read-only memory, an electrically erasable programmable memory, or a register. The storage medium is located in the memory, and the processor reads the information in the memory and completes the acts of the above method implementations in combination with its hardware.

For example, in implementations of the present disclosure, the receiving unit 310 shown in FIG. 3 and the sending unit 420 shown in FIG. 4 may be implemented by a transceiver, and the generating unit 410 shown in FIG. 4 may be implemented by a processor.

Figure 5:
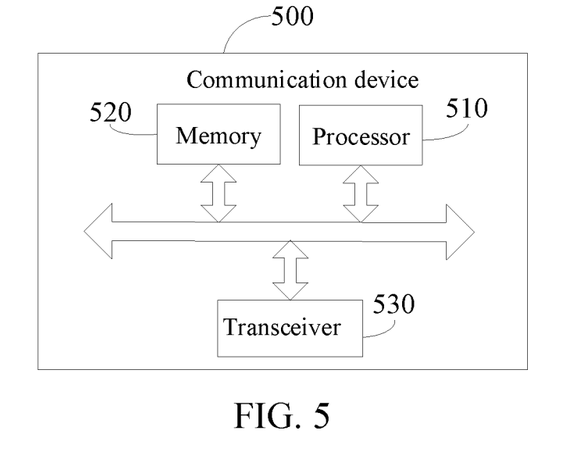
FIG. 5 is a schematic block diagram of a communication device according to an implementation of the present disclosure.

FIG. 5 is a schematic diagram of structure of a communication device 500 according to an implementation of the present disclosure.

The communication device 500 shown in FIG. 5 includes a processor 510. The processor 510 may call and run a computer program from a memory to implement the method in the implementations of the present disclosure.

Optionally, as shown in FIG. 5, the communication device 500 may further include a memory 520. The memory 520 may be configured to store indication information, and may also be configured to store codes, instructions, etc., executed by the processor 510. The processor 510 may call and run a computer program from the memory 520 to implement the method in the implementations of the present disclosure.

The memory 520 may be a separate device independent of the processor 510 or may be integrated in the processor 510.

Optionally, as shown in FIG. 5, the communication device 500 may further include a transceiver 530, and the processor 510 may control the transceiver 530 to communicate with other devices. Specifically, the transceiver 530 may send information or data to other devices or receive information or data sent by other devices.

The transceiver 530 may include a transmitter and a receiver. The transceiver 530 may further include antennas, and the quantity of antennas may be one or more.

Optionally, the communication device 500 may be a network device according to the implementations of the present disclosure, and the communication device 500 may implement the corresponding processes implemented by the network device in various methods in the implementations of the present disclosure. That is to say, the communication device 500 in the implementations of the present disclosure may correspond to the network device 400 in the implementations of the present disclosure, and may correspond to a corresponding subject that executes the method 200 according to the implementations of the present disclosure, which will not be described here for brevity.

Optionally, the communication device 500 may be a terminal device according to the implementations of the present disclosure, and the communication device 500 may implement corresponding processes implemented by the terminal device in various methods in the implementations of the present disclosure, that is to say, the communication device 500 according to the implementations of the present disclosure may correspond to the terminal device 300 in the implementations of the present disclosure, and may correspond to a corresponding subject that executes the method 200 according to the implementations of the present disclosure, which will not be described here for brevity.

It should be understood that the various components in the communication device 500 are connected through a bus system. In addition to a data bus, the bus system further includes a power bus, a control bus, a status signal bus.

In addition, an implementation of the present disclosure further provides a chip, which may be an integrated circuit chip with a signal processing capability, and may implement or execute the methods, acts and logical block diagrams disclosed in the implementations of the present disclosure.

Optionally, the chip may be applied to various communication devices to enable the communication devices installed with the chip to execute the methods, acta and logical block diagrams disclosed in the implementations of the present disclosure.

Figure 6:
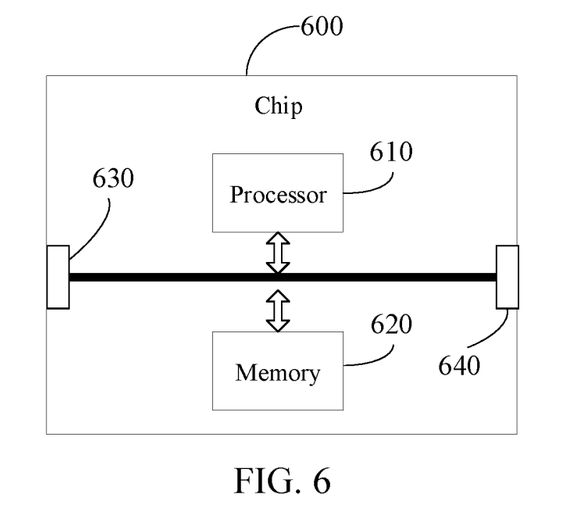
FIG. 6 is a schematic block diagram of a chip according to an implementation of the present disclosure.

FIG. 6 is a schematic diagram of structure of a chip according to an implementation of the present disclosure.

The chip 600 shown in FIG. 6 includes a processor 610. The processor 610 may call and run a computer program from a memory to implement the method in the implementations of the present disclosure.

Optionally, as shown in FIG. 6, the chip 600 may further include a memory 620. The processor 610 may call and run a computer program from the memory 620 to implement the method in the implementations of the present disclosure. The memory 620 may be configured to store indication information, or may be configured to store codes, instructions, etc., executed by the processor 610.

The memory 620 may be a separate device independent of the processor 610 or may be integrated in the processor 610.

Optionally, the chip 600 may further include an input interface 630. The processor 610 may control the input interface 630 to communicate with other devices or chips. Specifically, the processor 610 may obtain information or data sent by other devices or chips.

Optionally, the chip 600 may further include an output interface 640. The processor 610 may control the output interface 640 to communicate with other devices or chips. Specifically, the processor 610 may output information or data to other devices or chips.

Optionally, the chip may be applied in a network device of the implementations of the present disclosure, and the chip may implement the corresponding processes implemented by the network device in various methods of the implementations of the present disclosure, which will not be repeated here for brevity.

Optionally, the chip may be applied in a terminal device of the implementations of the present disclosure, and the chip may implement the corresponding processes implemented by the terminal device in the various methods of the implementations of the present disclosure, which will not be repeated here for brevity.

It should be understood that the chip mentioned in the implementation of the present disclosure may be referred to as a system-level chip, a system chip, a chip system or a system-on-chip, etc. It should also be understood that the various components in the chip 600 are connected through a bus system. In addition to a data bus, the bus system further includes a power bus, a control bus, a status signal bus.

The processor may include, but is not limited to:
a general purpose processor, a Digital Signal Processing (DSP), an Application Specific Integrated Circuit (ASIC), a Field Programmable Gate Array (FPGA) or another programmable logic device, a discrete gate or a transistor logic device, or a discrete hardware component, etc.

The processor may be configured to implement or execute methods, acts and logical block diagrams disclosed in the implementations of the present disclosure. The acts of the method disclosed with reference to the implementations of the present disclosure may be directly be directly embodied by the execution of the hardware decoding processor, or by the execution of a combination of hardware in the decoding processor and software modules. The software modules may be located in a mature storage medium in the art, such as a random access memory, a flash memory, a read-only memory, a programmable read-only memory or an erasable programmable memory, or a register. The storage medium is located in a memory, and the processor reads the information in the memory and completes the acts of the above method in combination with its hardware.

The memory includes but is not limited to:

a volatile memory and/or nonvolatile memory. The nonvolatile memory may be a Read-Only Memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. As an example, but not as a limitation, many forms of RAMs are available, such as a static random access memory (Static RAM, SRAM), a dynamic random access memory (Dynamic RAM, DRAM), a synchronous dynamic random access memory (Synchronous DRAM, SDRAM), a double data rate SDRAM (Double Data Rate SDRAM, DDR SDRAM), an enhanced SDRAM (Enhanced SDRAM, ESDRAM), a Synch link DRAM (synch link DRAM, SLDRAM), and a Direct Rambus RAM (Direct Rambus RAM, DR RAM).

It should be noted that the memory in the systems and methods described in the present disclosure is aimed at including but being not limited to these and any memory of another proper type.

An implementation of the present disclosure further provides a computer readable storage medium configured to store a computer program. The computer readable storage medium stores one or more programs including instructions which, when executed by a portable electronic device including multiple application programs, enable the portable electronic device to execute methods according to the implementations shown for method 300 to method 500.

Optionally, the computer readable storage medium may be applied in a network device of the implementations of the present disclosure, and the computer program enables the computer to perform the corresponding processes implemented by the network device in various methods of the implementations of the present disclosure, which is not described here for brevity.

Optionally, the computer readable storage medium may be applied in a mobile terminal/terminal device of the implementations of the present disclosure, and the computer program enables the computer to perform the corresponding processes implemented by the mobile terminal/terminal device in various methods of the implementations of the present disclosure, which is not described here for brevity.

An implementation of the present disclosure further provides a computer program product including a computer program.

Optionally, the computer program product may be applied in a network device of the implementation of the present disclosure, and the computer program enables the computer to perform the corresponding processes implemented by the network device in various methods of the implementations of the present disclosure, which is not described here for brevity.

Optionally, the computer program product may be applied in a mobile terminal/terminal device of the implementations of the present disclosure, and the computer program enables the computer to perform the corresponding processes implemented by the mobile terminal/terminal device in various methods according to the implementations of the present disclosure, which is not described here for brevity.

An implementation of the present disclosure further provides a computer program. When the computer program is executed on a computer, the computer program enables the computer to execute methods according to the implementations shown for method 300 to method 500.

Optionally, the computer program may be applied in a network device of the implementations of the present disclosure. When the computer program is run on a computer, the computer program enables the computer to execute the corresponding processes implemented by the network device in various methods of the implementations of the present disclosure, which is not described here for brevity.

An implementation of the present disclosure further provides a communication system, which may include a terminal device 300 as shown in FIG. 3 and a network device 400 as shown in FIG. 4. The terminal device 300 may be configured to implement the functions implemented by the terminal device in method 200, and the network device 400 may implement the functions implemented by the network device in method 200. To avoid repetition, they will not be repeated here.

It should also be understood that the terms used in implementations of the present disclosure and the appended claims are for the purpose of describing specific implementations only but are not intended to limit implementations of the present disclosure.

For example, as used in the implementations of the present disclosure and the appended claims, the singular forms "a", "said", "the forgoing" and "the" include plural referents unless the context clearly dictates something else.

Those of skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Those skilled in the art may use different manners to realize the described functions for each particular application, but such realization should not be considered to be beyond the scope of implementations of the present disclosure.

The function units may be stored in a computer readable storage medium if realized in a form of software functional units and sold or used as a separate product. Based on this understanding, the technical solution of implementations of the present disclosure, in essence, or the part contributing to the existing art, or a part of the technical solution, may be embodied in the form of a software product stored in a storage medium. The software product includes several instructions to enable a computer device (which may be a personal computer, a server, or a network device, etc.) to perform all or part of the acts of the methods described in implementations of the present disclosure. The aforementioned storage medium includes a medium capable of storing program codes, such as, a U disk, a mobile hard disk, a read-only memory (ROM), a random access memory, a magnetic disk or an optical disk, etc.

Those skilled in the art may clearly understand that for convenience and conciseness of description, the specific working processes of the systems, devices and units described above may refer to the corresponding processes in the above method implementations and will not be described repeatedly here.

In several implementations provided by the present disclosure, it should be understood that the disclosed systems, devices and methods may be implemented in other ways.

For example, the division of the units or modules or components in the above mentioned device implementations is only a logical function division, and there may be other division manners in actual implementation. For example, multiple units or modules or components may be combined or integrated into another system, or some units or modules or components may be ignored or not executed.

For another example, the units/modules/components described above as separate/display components may or may not be physically separated, that is, they may be located in one place, or they may be distributed to multiple network units. Some or all of the units/modules/components may be selected according to practical needs to achieve a purpose of the implementations of the present disclosure.

Finally, it should be noted that the mutual coupling or direct coupling or communication connection shown or discussed above may be indirect coupling or communication connection through some interface, apparatus or unit, and may be in electrical, mechanical or other forms.

The foregoing is merely exemplary implementations of the present disclosure, but the protection scope of implementations of the present disclosure is not limited thereto. Any person skilled in the art may easily conceive variations or substitutions within the technical scope disclosed by implementations of the present disclosure, and these variations or substitutions should be included within the protection scope of implementations of the present disclosure. Therefore, the protection scope of the implementations of the present disclosure should be determined by the protection scope of the claims.

We claim:

1. A method for receiving information, applied to a terminal device for data transmission by means of carrier aggregation, comprising:
   receiving, by the terminal device, first indication information sent by a network device;
   wherein the first indication information includes at least one bit, and the first indication information is used for indicating the terminal device to perform both: switching a currently activated bandwidth part (BWP) to a target BWP; and switching a currently activated physical downlink control channel (PDCCH) search space to a target PDCCH search space;
   wherein before receiving, by the terminal device, the first indication information sent by the network device, the method further comprises:
   receiving, by the terminal device, configuration information sent by the network device, wherein the configuration information comprises: configuration information of a BWP on each carrier, and configuration information of a PDCCH search space on each BWP;
   wherein each BWP comprises a plurality of PDCCH search spaces.

2. The method of claim 1, wherein before receiving, by the terminal device, the first indication information sent by the network device, the method further comprises:
   receiving, by the terminal device, mapping relationship information sent by the network device, wherein the mapping relationship information comprises a corresponding relationship between at least one piece of indication information and at least one combination, and the at least one piece of indication information comprises the first indication information;
   wherein each of the at least one combination comprises at least two of the following:
   activating a target carrier, activating the target BWP, activating the target PDCCH search space, switching a currently activated carrier to the target carrier, switching the currently activated BWP to the target BWP, and switching the currently activated PDCCH search space to the target PDCCH search space,
   wherein each of the at least one piece of indication information comprises the at least one bit in the first indication information, a quantity of the at least one bit is related to a quantity of target carriers, a maximum quantity of activatable BWPs on the target carrier, and a maximum quantity of activatable PDCCH search spaces on the target BWP.

3. The method of claim 1, wherein receiving, by the terminal device, the first indication information sent by the network device, comprises:
   monitoring, by the terminal device, target downlink control information (DCI) on a physical downlink control channel (PDCCH) in a target time unit, wherein the target DCI comprises the first indication information.

4. The method of claim 3, wherein monitoring, by the terminal device, the target downlink control information (DCI) on the physical downlink control channel (PDCCH) in the target time unit, comprises at least one of:
   monitoring, by the terminal device, the target DCI in a PDCCH search space on a first component carrier that has already been in an activated state, wherein the PDCCH search space on the first component carrier comprises at least one of: a common PDCCH search space; or a specific PDCCH search space; or
   monitoring, by the terminal device, the target DCI in a PDCCH search space on a second component carrier in an activated state predetermined by the terminal device and the network device, wherein the PDCCH search space on the second component carrier comprises at least one of: a common PDCCH search space; or a specific PDCCH search space, and
   wherein the target DCI is information scrambled with a specific Radio Network Temporary Identity (RNTI).

5. The method of claim 3, wherein the method further comprises:
   executing, by the terminal device, what is indicated in the first indication information at a kth time unit after the target time unit, wherein k is a non-negative integer.

6. The method of claim 1, wherein the first indication information is further used for indicating the terminal device to activate a target carrier, and before receiving, by the terminal device, the first indication information sent by the network device, the method further comprises:
   receiving, by the terminal device, a media access control (MAC) control element (CE) sent by the network device, wherein the MAC CE is used for indicating the terminal device to activate a first carrier, and the target carrier and the first carrier are different or same, and
   wherein the configuration information further comprises configuration information of at least one carrier, and the at least one carrier comprises the target carrier; and
   the target carrier comprises the target BWP, and the target BWP comprises the target PDCCH search space.

7. A method for sending information, comprising:
   generating, by a network device, first indication information includes at least one bit, wherein the first indication information is used for indicating a terminal device to perform both: switching a currently activated bandwidth part (BWP) to a target BWP; and switching a currently activated physical downlink control channel (PDCCH) search space to a target PDCCH search space; and sending, by the network device, the first indication information to the terminal device;

wherein before sending, by the network device, the first indication information to the terminal device, the method further comprises:

sending, by the network device, configuration information to the terminal device, wherein the configuration information comprises: configuration information of a BWP on each carrier, and configuration information of a PDCCH search space on each BWP;

wherein each BWP comprises a plurality of PDCCH search spaces.

8. The method of claim 7, wherein before sending, by the network device, the first indication information to the terminal device, the method further comprises:

sending, by the network device, mapping relationship information to the terminal device, wherein the mapping relationship information comprises a corresponding relationship between at least one piece of indication information and at least one combination, the at least one piece of indication information comprises the first indication information;

wherein each of the at least one combination comprises at least two of the following:

activating a target carrier, activating the target BWP, activating the target PDCCH search space, switching a currently activated carrier to the target carrier, switching the currently activated BWP to the target BWP, and switching the currently activated PDCCH search space to the target PDCCH search space, wherein each of the at least one piece of indication information comprises the at least one bit in the first indication information, a quantity of the at least one bit is related to a quantity of target carriers, a maximum quantity of activatable BWPs on the target carrier, and a maximum quantity of activatable PDCCH search spaces on the target BWP.

9. The method of claim 7, wherein sending, by the network device, the first indication information to the terminal device, comprises:

sending, by the network device, target downlink control information (DCI) to the terminal device on a PDCCH in a target time unit, wherein the target DCI comprises the first indication information, wherein sending, by the network device, the target downlink control information (DCI) to the terminal device on the PDCCH in the target time unit, comprises at least one of:

sending, by the network device, the target DCI to the terminal device in a PDCCH search space on a first component carrier that has already been in an activated state, wherein the PDCCH search space on the first component carrier comprises at least one of: a common PDCCH search space; or a specific PDCCH search space; or sending, by the network device, the target DCI to the terminal device in a PDCCH search space on a second component carrier in an activated state predetermined by the terminal device and the network device, wherein the PDCCH search space on the second component carrier comprises at least one of: a common PDCCH search space; or a specific PDCCH search space.

10. The method of claim 9, wherein
the target DCI is information scrambled with a specific Radio Network Temporary Identity (RNTI).

11. A terminal device, comprising: a processor and a transceiver, wherein
the transceiver is configured to receive first indication information sent by a network device;

wherein the first indication information includes at least one bit, and the first indication information is used for indicating the terminal device to perform both: switching a currently activated bandwidth part (BWP) to a target BWP; and switching a currently activated physical downlink control channel (PDCCH) search space to a target PDCCH search space;

wherein the transceiver is further configured to: before receiving the first indication information sent by the network device, receive configuration information sent by the network device; wherein the configuration information comprises: configuration information of a BWP on each carrier, and configuration information of a PDCCH search space on each BWP;

wherein each BWP comprises a plurality of PDCCH search spaces.

12. The terminal device of claim 11, wherein before the transceiver is configured to receive the first indication information sent by the network device, the transceiver is further configured to:

receive mapping relationship information sent by the network device, wherein the mapping relationship information comprises a corresponding relationship between at least one piece of indication information and at least one combination, and the at least one piece of indication information comprises the first indication information;

wherein each of the at least one combination comprises at least two of the following:

activating a target carrier, activating the target BWP, activating the target PDCCH search space, switching a currently activated carrier to the target carrier, switching the currently activated BWP to the target BWP, and switching the currently activated PDCCH search space to the target PDCCH search space, wherein each of the at least one piece of indication information comprises the at least one bit in the first indication information, a quantity of the at least one bit is related to a quantity of target carriers, a maximum quantity of activatable BWPs on the target carrier and a maximum quantity of activatable PDCCH search spaces on the target BWP.

13. The terminal device of claim 11, wherein the transceiver is specifically configured to:

monitor target downlink control information (DCI) on a PDCCH in a target time unit, wherein the target DCI comprises the first indication information.

14. The terminal device of claim 13, wherein the transceiver is more specifically configured to perform at least one of:

monitoring the target DCI in a PDCCH search space on a first component carrier that has already been in an activated state, wherein the PDCCH search space on the first component carrier comprises at least one of: a common PDCCH search space; or a specific PDCCH search space; or monitoring the target DCI in a PDCCH search space on a second component carrier in an activated state predetermined by the terminal device and the network device, wherein the PDCCH search space on the second component carrier comprises at least one of: a common PDCCH search space; or a specific PDCCH search space, and wherein the target DCI is information scrambled with a specific Radio Network Temporary Identity (RNTI).

15. The terminal device of claim 13, wherein the processor is configured to execute what is indicated in the first indication information at a kth time unit after the target time unit, wherein k is a non-negative integer.

16. The terminal device of claim 11, wherein the first indication information is further used for indicating the terminal device to activate a target carrier, and before the transceiver is configured to receive the first indication information sent by the network device, the transceiver is further configured to:
receive a media access control (MAC) control element (CE) sent by the network device, wherein the MAC CE is used for indicating the terminal device to activate a first carrier, and the target carrier and the first carrier are different or same, and
wherein the configuration information further comprises configuration information of at least one carrier, and the at least one carrier comprises the target carrier; and
the target carrier comprises the target BWP, and the target BWP comprises the target PDCCH search space.

17. A network device, comprising: a processor and a transceiver, wherein
the processor is configured to generate first indication information includes at least one bit, wherein the first indication information is used for indicating a terminal device to perform both: switching a currently activated bandwidth part (BWP) to a target BWP; and switching a currently activated physical downlink control channel (PDCCH) search space to a target PDCCH search space; and
the transceiver is configured to send the first indication information to the terminal device;
wherein the transceiver is further configured to: before sending the first indication information to the terminal device, send configuration information to the terminal device; wherein the configuration information comprises: configuration information of a BWP on each carrier, and configuration information of a PDCCH search space on each BWP;
wherein each BWP comprises a plurality of PDCCH search spaces.

18. The network device of claim 17, wherein before the transceiver is configured to send the first indication information to the terminal device, the transceiver is further configured to:
send mapping relationship information to the terminal device, wherein the mapping relationship information comprises a corresponding relationship between at least one piece of indication information and at least one combination, the at least one piece of indication information comprises the first indication information;
wherein each of the at least one combination comprises at least two of the following:
activating a target carrier, activating the target BWP, activating the target PDCCH search space, switching a currently activated carrier to the target carrier, switching the currently activated BWP to the target BWP, and switching the currently activated PDCCH search space to the target PDCCH search space,
wherein each of the at least one piece of indication information comprises the at least one bit in the first indication information, a quantity of the at least one bit is related to a quantity of target carriers, a maximum quantity of activatable BWPs on the target carrier and a maximum quantity of activatable PDCCH search spaces on the target BWP.

19. The network device of claim 17, wherein the transceiver is specifically configured to:
send target downlink control information (DCI) to the terminal device on a PDCCH in a target time unit, wherein the target DCI comprises the first indication information,
wherein the transceiver is more specifically configured to perform at least one of:
sending the target DCI to the terminal device in a PDCCH search space on a component carrier that has already been in an activated state; or
sending the target DCI to the terminal device in a PDCCH search space on a component carrier in an activated state predetermined by the terminal device and the network device.

20. The network device of claim 17, wherein the first indication information is further used for indicating the terminal device to activate a target carrier, and before the transceiver is configured to send the first indication information to the terminal device, the transceiver is further configured to:
send a media access control (MAC) control element (CE) to the terminal device, wherein the MAC CE is used for indicating the terminal device to activate a first carrier, and the target carrier and the first carrier are different or same, and
wherein the configuration information further comprises configuration information of at least one carrier, and the at least one carrier comprises the target carrier; and
the target carrier comprises the target BWP, and the target BWP comprises the target PDCCH search space.

* * * * *